US012208445B2

United States Patent
Gusev et al.

(10) Patent No.: US 12,208,445 B2
(45) Date of Patent: Jan. 28, 2025

(54) METHOD FOR PREPARING A CHARGE INGOT FOR PRODUCTION OF PRODUCTS BY CASTING

(71) Applicant: OBSHCHESTVO S OGRANICHENNOY OTVETSTVENNOST'YU "OBEDINENNAYA KOMPANIYA RUSAL INSHENERNO-TEKHNOLOGICHESKIY TSENTR", Krasnoyarsk (RU)

(72) Inventors: Aleksandr Olegovich Gusev, Krasnoyarsk (RU); Artem Valer'evich Zubrovskij, Krasnoyarsk (RU); Konstantin Vasil'evich Efimov, Krasnoyarsk (RU); Aleksej Mikhajlovich Azarevich, Krasnoyarsk (RU)

(73) Assignee: OBSHCHESTVO S OGRANICHENNOY OTVETSTVENNOOST'YU "OBEDINENNAYA KOMPANIYA RUSAL INZHENERNO-TEKHNOLOGICHESKIY TSENTR", Krasnoyarsk (RU)

( * ) Notice: Subject to any disclaimer, the term of this patent is extended or adjusted under 35 U.S.C. 154(b) by 87 days.

(21) Appl. No.: 16/943,294

(22) Filed: Jul. 30, 2020

(65) Prior Publication Data

US 2021/0008613 A1    Jan. 14, 2021

Related U.S. Application Data

(63) Continuation of application No. PCT/RU2019/050001, filed on Jan. 10, 2019.

(30) Foreign Application Priority Data

Jan. 30, 2018   (RU) .............................. 2018103548

(51) Int. Cl.
*B22D 7/12* (2006.01)
*C22C 9/06* (2006.01)
(Continued)

(52) U.S. Cl.
CPC ................. *B22D 7/12* (2013.01); *C22C 9/06* (2013.01); *C22F 1/08* (2013.01); *C25C 3/12* (2013.01)

(58) Field of Classification Search
CPC ........ B22D 7/12; B22D 21/025; B22D 7/005; B22D 3/00; B22D 13/00; C22C 9/06;
(Continued)

(56) References Cited

U.S. PATENT DOCUMENTS 3,807,986 A    4/1974 Funk et al.
4,075,067 A    2/1978 Kumar
(Continued)

FOREIGN PATENT DOCUMENTS

CN    1788094 A    6/2006
CN    1809940 A    7/2006
(Continued)

OTHER PUBLICATIONS

Yang et al., "A self-repairing cermet anode: Preparation and corrosion behavior of (Cu—Ni—Fe)/NiFe2O4 cermet with synergistic action," J. Am. Ceram. Soc., 2017, 100: 887-893 (Year: 2017).*
(Continued)

*Primary Examiner* — John A Hevey
(74) *Attorney, Agent, or Firm* — Baker & McKenzie LLP

(57) ABSTRACT

The invention relates to metallurgical production, and more particularly to preparing a charge ingot which is used for
(Continued)

Distance from the edge, mm producing bronze ingots by casting. As a starting charge material, a spent inert anode previously used in the electrolytic production of aluminium is utilised, that is covered with alumina, allowing same to react with a bath which flows out of the anode during a thermal treatment performed at a temperature within a range of 950-1200° C., followed by soaking in a furnace for at least 3 days. The invention makes it possible to obtain a charge ingot with a minimal electrolyte content.

5 Claims, 2 Drawing Sheets

(51) Int. Cl.
*C22F 1/08* (2006.01)
*C25C 3/12* (2006.01)

(58) Field of Classification Search
CPC ... C22C 9/00; C22C 30/02; C22F 1/08; C25C 3/12; C22B 9/10; C22B 9/14; C22B 1/02; C22B 7/00; C22B 1/00
See application file for complete search history.

(56) References Cited

U.S. PATENT DOCUMENTS

| | | | | |
|---|---|---|---|---|
| 5,284,562 | A | * | 2/1994 | Beck .................. C25C 3/08 204/244 |
| 6,030,518 | A | * | 2/2000 | Dawless .................. C25C 3/12 204/243.1 |
| 2003/0201189 | A1 | | 10/2003 | Bergsma et al. |
| 2004/0011661 | A1 | * | 1/2004 | Bradford .................. C25C 3/08 205/385 |

FOREIGN PATENT DOCUMENTS

| | | |
|---|---|---|
| CN | 104073704 A | 10/2014 |
| CN | 104975308 A | 10/2015 |
| GB | 1458228 A | 12/1976 |
| RU | 2075516 C1 | 3/1997 |
| RU | 2090624 C1 | 9/1997 |
| RU | 2149190 C1 | 5/2000 |

OTHER PUBLICATIONS

International Search Report and Written Opinion of the International Searching Authority dated Apr. 18, 2019, 6 pages.
Search Report dated Jul. 26, 2018 in connection with Russian patent application No. 2018103548, 2 pages.
Office Action dated Sep. 28, 2021 in connection with Chinese Application No. 2019800077752, 2 pages.

* cited by examiner

METHOD FOR PREPARING A CHARGE INGOT FOR PRODUCTION OF PRODUCTS BY CASTING

CROSS-REFERENCE TO RELATED APPLICATIONS

This application is a continuation of and claims priority to PCT Application No. PCT/RU2019/050001 filed Jan. 10, 2019, which itself claims priority to Russian Patent Application No. 2018103548 filed Jan. 30, 2018. The contents from all of the above are hereby incorporated in their entirety by reference.

FIELD OF THE INVENTION

The invention relates to metallurgical production, and particularly to a metal solid charge that can be used for production of products by sand mold casting, as well as by centrifugal casting when producing castings and ingots.

PRIOR ART

There are various classes of inert anodes used upon electrolytic reduction: metal, ceramic and cermet. From the standpoint of economic efficiency and technical feasibility, anodes made of metal alloys are the most preferred ones since they have lower cost, high electrical conductivity, ductility and at the same time mechanical strength, they are easily processed and welded (international application WO 2015/026257). A disadvantage of this technology is that, upon electrolytic reduction, iron concentration in castings is lowered, voids are filled with the bath which complicates further processing of castings for their subsequent use in processing.

There is a method for producing nickel-based heat-resistant foundry alloys (Russian patent No. 2470081, C22C1/02, C22B9/02, published on Dec. 20, 2012) that includes preparation of charge materials containing waste of heat-resistant nickel alloys, and their subsequent vacuum remelting. Returns of casting production and turnings, obtained upon cutting of rods made of heat-resistant nickel alloys, in the amount of 3-10% of the weight of charge materials, are used as waste of heat-resistant nickel alloys. Turnings are preliminarily washed with running tap water until residual content of oils on the turnings' surface is 3-5%, degreased in an ultrasonic bath with a water solution of a technical detergent, washed in an ultrasonic bath using running tap water, and then washed in standing distilled water. Then, there is convection drying in rotating drum screens and magnetic separation of turnings.

A disadvantage of the method is a long process cycle, a large number of equipment, a large number of maintenance personnel, high labor costs.

There is a method for producing a charge material for a metallurgical area (Russian patent No. 2149190, C2105/52, C22B1/00, published on May 20, 2000) that includes: preliminary filling of bins of a casting machine with a filler, its subsequent filling with liquid cast iron and using a force on the filler ensuring that the Archimedes' buoyant force is overcome. Solid additives with magnetic properties are used as a filler. The effect on solid additives is carried out right after filling of cast iron by an alternating, variable or constant magnetic field for 1-6 seconds with magnetic field intensity ensuring a force within 0.01-50 T.

A disadvantage of the method is the need to provide constant or variable magnetic field, lack of ability to remove bath residues from a charge ingot throughout the entire volume, formation of a large amount of fluorine-containing vapors and carbonization of a charge ingot.

DISCLOSURE OF THE INVENTION

The problem of the proposed invention is to remove a bath from a spent inert anode to be re-used upon production of castings and ingots.

The technical result is a solution of a problem set and production of a charge ingot with minimal content of bath in it.

The technical result is achieved in that the method for producing a charge ingot for production of castings containing copper, nickel and iron, is characterized in that as a starting charge material, a spent inert anode previously used in the electrolytic production of aluminium is utilised, that is covered with alumina, allowing same to react with a bath which flows out of the anode during a thermal treatment performed at a temperature within a range of 950-1200° C., followed by soaking in a furnace for at least 3 days.

The method is characterized by specific embodiments.

The said inert anode preferably consists of 45-60 wt % copper and 10-25 wt % nickel with the remainder iron.

The method is intended for production of castings by centrifugal casting or sand mold casting.

Alumina batching is carried out upon filling based on the condition of ensuring a full immersion of said inert anode in it.

The alumina volume ratio is 3.4 times higher with regard to said inert anode.

BRIEF DESCRIPTION OF THE DRAWINGS

The essence of the invention is illustrated by the following drawings.

EMBODIMENT OF THE INVENTION

Figure 1:
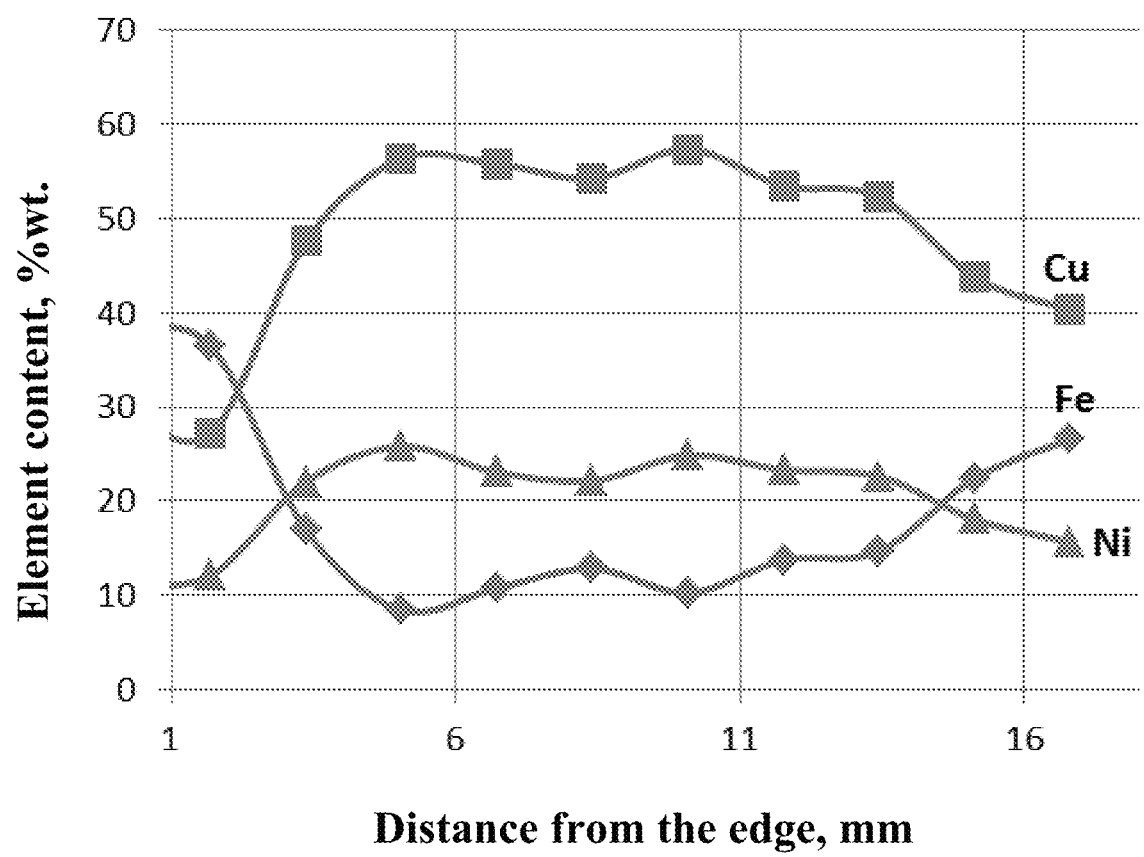
FIG. 1 shows a graph for a distribution of chemical elements across the cross section of samples.

During the electrolytic production of aluminium using inert anodes there is a reduction of iron content in them. Voids, formed upon iron dissolution during the electrolytic reduction, are filled with a bath that, during casting, makes it into the hearth of a melting furnace destructing the lining and contaminating liquid metal by non-metallic inclusions, and the air space above the furnace is filled with a large amount of fluorine-containing vapors.

Samples of spent inert anodes were examined. The highest amount of fluorides is registered in the central porous part of a sample, moreover, the fluorine content varies within very wide limits (5% to 33%) which is explained by the presence of less porous areas in the structure of an oxide layer of an anode grid after an electrolytic test. Basic components of the bath are fluorine, sodium, and potassium. Results are given in Table 1.

TABLE 1

| Area No. | O | F | Na | Al | Si | Cl | K | Ca | Cr | Fe | Ni | Cu |
|---|---|---|---|---|---|---|---|---|---|---|---|---|
| 1 | 26.01 | | | 1.12 | | | | | | 72.88 | | |
| 2 | 23.99 | | | 0.83 | | | | | | 75.18 | | |
| 3 | 23.81 | | | 0.84 | | | | | | 75.36 | | |
| 4 | 24.95 | | | 2.01 | | | 0.13 | | | 72.91 | | |
| 5 | 21.97 | 8.2 | 2.73 | 3.74 | | | 0.36 | 0.19 | | 59.24 | 1.22 | 2.34 |
| 6 | 4.39 | 24.78 | 9.96 | 8.38 | | | 0.96 | 0.64 | | 10.36 | 12.73 | 27.8 |
| 7 | 1.89 | 7.28 | | 2.73 | | | 0.2 | 0.35 | | 5.66 | 26.34 | 55.56 |
| 8 | 1.53 | 5.1 | | 2.01 | 0.17 | | | 0.34 | | 4.95 | 27.08 | 58.81 |
| 9 | 1.75 | 6.33 | | 2.38 | | | 0.2 | 0.48 | | 4.86 | 26.96 | 57.05 |
| 10 | 2.28 | 27.77 | 12.3 | 9.72 | | | 1.17 | 0.77 | | 4.9 | 12.99 | 28.13 |
| 11 | 3.02 | 32.28 | 13.02 | 10.69 | | | 1.46 | 0.82 | | 5.2 | 10.68 | 22.84 |
| 12 | 1.94 | 32.61 | 13.16 | 11.27 | | | 1.55 | 0.84 | | 4.78 | 10.69 | 23.16 |
| 13 | 1.89 | 24.29 | 10.59 | 8.89 | | | 1.09 | 0.73 | | 4.86 | 15.08 | 32.58 |
| 14 | 1.47 | 6.05 | | 2.31 | | | 0.17 | 0.39 | | 4.87 | 26.96 | 57.8 |
| 15 | 1.53 | 4.84 | | 1.85 | 0.14 | | | 0.37 | | 5.17 | 27.19 | 58.91 |
| 16 | 0.01 | 8.01 | 3.96 | 3.03 | 0.2 | 0.14 | 0.34 | 0.45 | | 5.98 | 24.89 | 53 |
| 17 | 3.48 | 14.92 | 6.81 | 5.13 | | | 0.48 | 0.5 | 0.17 | 6.71 | 20.63 | 41.17 |
| 18 | 5.11 | 21.55 | 8.54 | 7.34 | | | 0.79 | 0.44 | | 11.26 | 14.09 | 30.88 |
| 19 | 13.3 | 16.52 | 5.64 | 5.39 | | | 0.5 | 0.29 | | 31.3 | 8.77 | 18.28 |
| 20 | 22.63 | 5.5 | 1.68 | 2.47 | | | 0.15 | | | 67.13 | | 0.44 |
| 21 | 24.47 | | | 1.82 | | | 0.14 | | | 73.58 | | |
| 22 | 24.28 | 4.72 | 1.25 | 3.33 | | | | | | 66.42 | | |
| 23 | 24.51 | | | 0.9 | | | | | | 74.59 | | |
| 24 | 25.07 | | | 0.77 | | | | | | 74.16 | | |

All results are given in wt %

To neutralize the bath obtained by melting, a spent inert anode is covered with alumina, allowing same to react with a bath which flows out of the anode during a thermal treatment. After a thermal treatment, alumina can be used upon the electrolytic production of aluminium.

A spent inert anode is heat treated within a temperature range of 950° C.-1200° C. and is soaked in a furnace for about 3 days. These are optimal conditions for a thermal treatment of a spent inert anode, obtained experimentally, at which the technical result is achieved.

Heating less than 950° C. will not allow to transform a bath into liquid state which is necessary to remove it from a spent inert anode, there is no need to maintain temperature over 1200° C. since by the time a furnace is heated to 1200° C. the entire bath is removed from a spent inert anode.

Alumina is batched based on the condition of ensuring full immersion of a spent inert anode in it, experiments proved that this requires alumina ratio to be 3.4 times higher with regard to a spend inert anode. Such ratio provides a uniform alumina bed throughout the entire perimeter of a spent inert anode that does not allow a bath obtained by melting to interact with a tank where a thermal treatment is carried out, thereby destroying it.

Upon pilot testing, an experiment was carried out to reduce the amount of alumina to 1-2 times higher with regard to a spent inert anode, as a result of which a tank was destroyed, a large emission of gaseous compounds was also observed upon a thermal treatment.

The minimum baking time achieved was 72 hours or 3 days not including cooling down to a room temperature.

Soaking in a furnace for less than 3 days is not expedient since a casting does not heat up as much as it is necessary to remove a bath, and more than 3 days will result in additional power costs.

After pilot testing, samples of spent inert anodes were transferred to the Research Laboratory of the Casting Center of RUSAL ETC Ltd. for examination of their structure.

Structure examination of samples submitted was carried out using OLYMPUS SZX16 optical stereo microscope (OM). To plot distribution graphs for contents of chemical elements across a cross section of submitted samples of spent inert anodes, an electron probe microanalysis was conducted using FEI Quanta FBG 650 scanning electron microscope (SEM) with X-MaxN SDD energy dispersive spectrometer (EDS).

Upon a structural analysis, it was discovered that samples have a layered structure. A relatively dense oxide layer of various thickness is observed on the surface of samples, and the base is porous and non-uniform metal residues. The EDS analysis method was used to plot distribution graphs for contents of chemical elements across a cross section of spent anodes.

The main composition of a charge obtained, wt %, is copper 45-60, nickel 10-25, iron—the remainder. This composition of a charge ingot allows to use it upon production of parts by casting with high copper and nickel contents. Distribution of chemical elements across a cross section of samples is shown in a distribution graph (FIG. 1).

Embodiments

Embodiment 1. Laboratory tests.

A 3 kA spent inert anode after 70 days of electrolytic reduction was selected as an initial material for developing a method for processing spent inert anodes with iron content over 70%.

Using X—MET3000EX+ X-ray analyzer (method—FP), concentration of the main alloying elements in a spent inert anode was determined, wt %: copper—70, nickel—19, iron—11.

A 2.6 kg spent inert anode was loaded into an alumina crucible, and was filled with alumina weighing 2 kg.

Thermal treatment conditions: heating in Naberteherm H31\N furnace up to 1050° C., soaking for 3 hours, cooling down together with the furnace.

About 20%-30% of alumina interacted with a bath.

After a thermal treatment, a spent inert anode was clean, without dross, it does not require additional cleaning in a shot blasting unit.

Weight of a spent inert anode after a thermal treatment was 2.2 kg, the weight difference was 0.4 kg.

To determine the number of thermal treatment cycles, we load a spent inert anode into a crucible once again, and fill it with alumina weighing 2 kg. After carrying out a repeated thermal treatment, the weight of a spent inert anode was 2.2 kg. Therefore, a bath is completed removed upon these thermal treatment conditions.

Embodiment 2. Pilot testing.

A spent inert anode after 150 days of electrolytic reduction was selected as an initial material.

Figure 2:
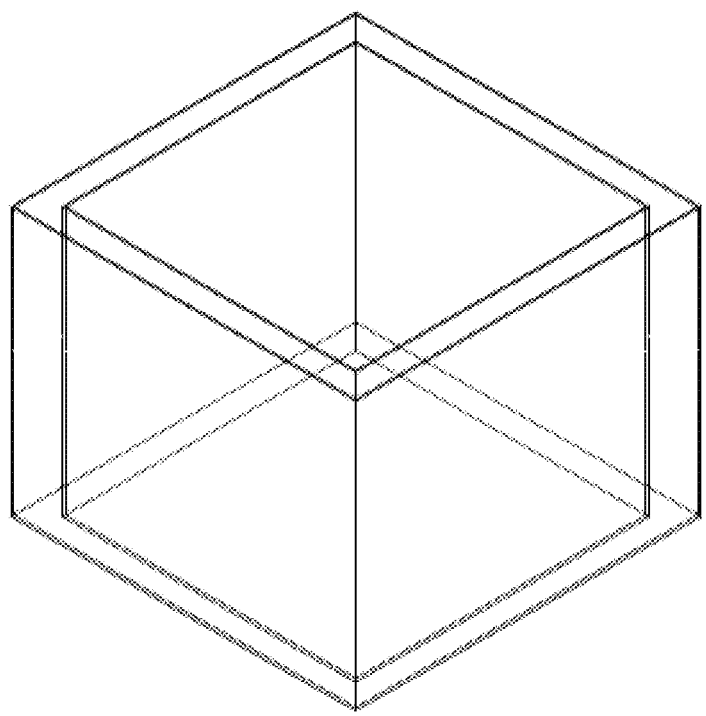
FIG. 2 shows the location of the steel tank in the resistance furnace with the spiral heaters; said tank is filled with alumina and used for thermal treatment purposes.

A 20 kW resistance furnace with spiral heaters made of fechral was used for baking (FIG. 2). Heaters are located along the perimeter of the furnace and on the bottom, 3 chrome-aluminum thermocouples were placed into alumina protection tubes and were positioned throughout the furnace hearth to control the furnace response time in real time. Protection tubes with thermocouples inside a tank were filled with alumina together with a spent inert anode until its full immersion, alumina weight was about 1000 kg.

One of the thermocouples measured temperature directly on heaters, the second one—next to the edge of the tank (external thermocouple), the third one—in the middle of a spent inert anode (internal thermocouple).

After placing a spent inert anode weighing 330 kg inside a furnace, it was heated up to a temperature of 950° C.

After a thermal treatment, alumina that reacted with a bath separates from a spent inert anode rather easily in the amount of ~10% of the weight of samples.

Steel 20x23n18 was used as a material of a tank for thermal treatment.

Figure 3:
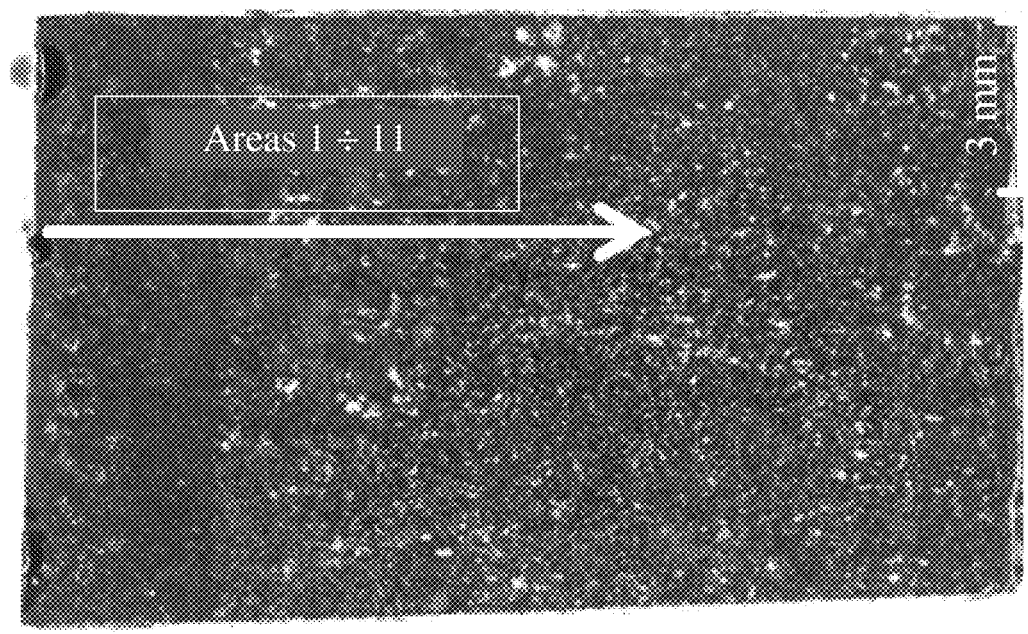
FIG. 3 shows both the area and direction of spectral scans of samples, at 11 different points, as per Embodiment 2.

After a thermal treatment, minimal content of fluorine, sodium and potassium as bath components was detected in a sample which is indicative of almost complete purification of a spent inert anode. Results are given in Table 2. Data of a local chemical composition were collected from areas located along red lines (FIG. 3).

TABLE 2

| Area No. | O | F | Na | Al | Si | S | Cl | K | Ca | Cr | Fe | Ni | Cu |
|---|---|---|---|---|---|---|---|---|---|---|---|---|---|
| 1 | 18.01 | | 0.18 | 1.39 | 0.17 | | 0.45 | | | | 38.32 | 11.24 | 30.24 |
| 2 | 15.96 | 0.01 | 0.14 | 2.32 | | | | 0.14 | 0.17 | 0.16 | 36.45 | 12.13 | 27.2 |
| 3 | 11.2 | | 0.12 | 1.55 | 0.22 | 0.14 | 0.2 | | 0.21 | | 16.99 | 22.05 | 47.53 |
| 4 | 7.47 | | 0.08 | 1.09 | 0.23 | | 0.19 | 0.19 | 0.21 | | 8.5 | 25.78 | 56.26 |
| 5 | 8.3 | | 0.33 | 1.12 | 0.14 | 0.12 | 0.22 | | 0.15 | | 10.82 | 23.08 | 55.72 |
| 6 | 6.99 | 0.16 | 0.05 | 1.21 | 0.16 | | | | 0.18 | | 12.88 | 22.2 | 54.17 |
| 7 | 6.11 | | | 0.93 | 0.19 | | | 0.11 | 0.2 | | 10.33 | 24.86 | 57.28 |
| 8 | 8.01 | | | 1.17 | 0.11 | | | | 0.18 | | 13.78 | 23.34 | 53.4 |
| 9 | 8.91 | | | 1.08 | 0.23 | | | | 0.17 | | 14.71 | 22.65 | 52.25 |
| 10 | 13.44 | | 0.15 | 1.83 | 0.15 | | | | 0.2 | | 22.45 | 18.09 | 43.69 |
| 11 | 14.97 | | 0.17 | 1.86 | 0.21 | | | | 0.18 | | 26.6 | 15.7 | 40.29 |

All results are given in wt %

Figure 4:
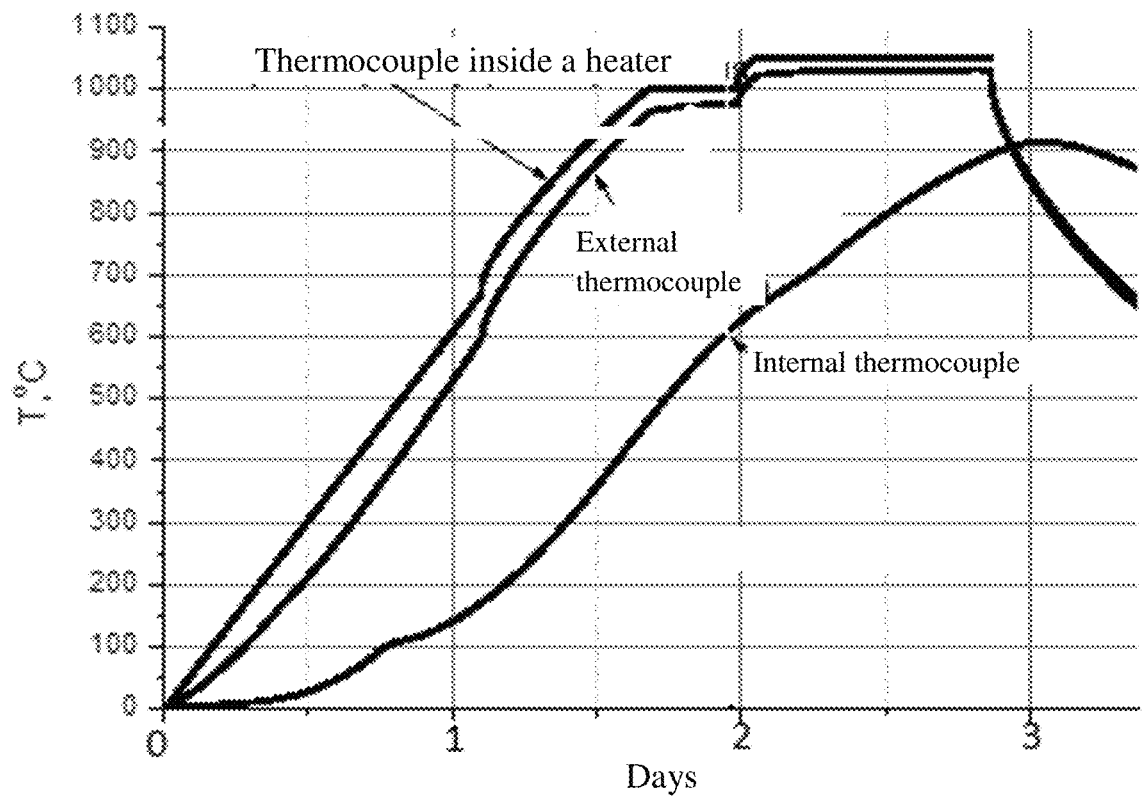
FIG. 4 shows a graph for the thermal treatment conditions as per Embodiment 3.

Embodiment 3. Similar to embodiment 2, test were carried out at a heating temperature of 1050° C., all of the other data remained unchanged. After a thermal treatment, minimal content of fluorine, sodium and potassium as bath components was detected in a sample. Results are given in Table 3. A graph for the performed thermal treatment conditions is shown in FIG. 4.

TABLE 3

| Area No. | O | F | Na | Al | Si | S | Cl | K | Ca | Cr | Fe | Ni | Cu |
|---|---|---|---|---|---|---|---|---|---|---|---|---|---|
| 1 | 16.03 | | | 2.08 | 0.21 | | 0.45 | | | | 36.37 | 15.88 | 28.98 |
| 2 | 13.56 | | | 1.62 | 0.21 | | | 0.14 | 0.17 | | 32.48 | 16.09 | 35.73 |
| 3 | 15.5 | | 0.02 | 1.05 | 0.21 | 0.04 | 0.2 | | | | 23.13 | 17.33 | 42.52 |
| 4 | 8.28 | 0.005 | 0.05 | 1.94 | 0.4 | | 0.19 | 0.19 | 0.21 | 0.12 | 24.86 | 17.15 | 46.6 |
| 5 | 10.2 | 0.01 | 0.3 | 1.76 | | | 0.22 | | 0.15 | | 27.13 | 18.44 | 42.09 |
| 6 | 9.9 | | | 1.24 | 0.53 | 0.02 | | | 0.18 | | 26.36 | 18.36 | 43.41 |
| 7 | 11.57 | 0.003 | 0.09 | 2.19 | 0.43 | | 0.11 | | 0.2 | | 22.28 | 18.98 | 44.147 |
| 8 | 9.78 | | | 1.37 | 0.21 | | | | 0.18 | | 19.1 | 20.67 | 48.69 |

All results are given in wt %

Embodiment 4. In the same manner, tests were carried out at a heating temperature of 1200° C., all of the other data remained unchanged. Obtained results were the same as for embodiments 2, 3.

This method differs from all alternatives in that it refers to processing of bath-containing charge materials, particularly spent inert anodes that can be used for further remelting.

This method allows to remove a bath from a spent inert anode to be re-used upon production of castings and ingots, without gas emissions into the environment.

What is claimed is:

1. A method for producing a charge ingot for production of castings containing copper, nickel and iron, the method comprising:
    covering a spent inert anode previously used in an electrolytic production of aluminium with alumina, wherein:
        the spent inert anode comprises copper, nickel, and iron, and
        dissolution of at least some of the iron during the electrolytic production of aluminum creates voids in the spent anode which are filled with a bath;
    executing a thermal treatment process that reacts the alumina on the covered spent inert anode with the bath to neutralize the bath during the thermal treatment process, wherein the bath flows out of the covered spent inert anode at a temperature within a range of 950-1200° C.; and
    in response to executing the thermal treatment process on the covered spent inert anode, soaking the covered spent inert anode in a furnace for at least 3 days.

2. The method according to claim 1, wherein the spent inert anode comprises 45-60 wt % copper and 10-25 wt % nickel with the remainder being iron.

3. The method according to claim 1, wherein covering the spent inert anode comprises fully immersing the spent inert anode in the alumina.

4. The method according to claim 3, wherein the volume ratio of the alumina is 3.4 times higher relative to the spent inert anode.

5. The method according to claim 1, wherein the charge ingot is used to produce castings based on one of:
    a centrifugal casting process, or
    a sand mold casting process.

* * * * *